(12) United States Patent
Berntsson et al.

(10) Patent No.: US 7,770,918 B2
(45) Date of Patent: Aug. 10, 2010

(54) CURTAIN AIRBAG AND VEHICLE

(75) Inventors: Mats Berntsson, Victoria (AU); Fredrik Kjell, Bramhult (SE); Börje Jacobsson, Brämhult (SE); Ola Henriksson, Vargarda (SE)

(73) Assignee: Autoliv Development AB, Vargarda (SE)

( * ) Notice: Subject to any disclaimer, the term of this patent is extended or adjusted under 35 U.S.C. 154(b) by 1 day.

(21) Appl. No.: 11/853,292

(22) Filed: Sep. 11, 2007

(65) Prior Publication Data
US 2007/0296189 A1    Dec. 27, 2007

Related U.S. Application Data

(63) Continuation of application No. PCT/EP2006/001635, filed on Feb. 23, 2006.

(30) Foreign Application Priority Data
Mar. 11, 2005   (DE) .................. 10 2005 011 676

(51) Int. Cl.
*B60R 21/213* (2006.01)
(52) U.S. Cl. .................................................. 280/730.2
(58) Field of Classification Search .............. 280/728.2, 280/730.2, 743.1
See application file for complete search history.

(56) References Cited

U.S. PATENT DOCUMENTS

| | | | | |
|---|---|---|---|---|
| 6,338,498 B1 * | 1/2002 | Niederman et al. | ...... | 280/728.2 |
| 6,481,743 B1 * | 11/2002 | Tobe et al. | ...... | 280/728.2 |
| 6,676,154 B2 * | 1/2004 | Fischer | ...... | 280/729 |
| 6,808,199 B2 * | 10/2004 | Saderholm et al. | ...... | 280/730.2 |
| 6,830,262 B2 * | 12/2004 | Sonnenberg et al. | ...... | 280/730.2 |
| 2004/0007857 A1 * | 1/2004 | Sonnenberg et al. | ...... | 280/730.2 |

FOREIGN PATENT DOCUMENTS

| | | |
|---|---|---|
| DE | 103 31 133 A1 | 1/2004 |
| EP | 0 980 796 A | 2/2000 |
| EP | 1 637 408 A | 3/2006 |

* cited by examiner

*Primary Examiner*—Lesley Morris
*Assistant Examiner*—Robert A Coker
(74) *Attorney, Agent, or Firm*—Brinks Hofer Gilson & Lione

(57) ABSTRACT

A curtain airbag for installation in the roof frame area of a motor vehicle exhibits at least one guide chamber which is located in the upper section of curtain airbag and which is connected with its inflatable area from the point of view of gas flow. The at least one guide chamber can be inflated on the outer side of the curtain airbag when this is in a mounted state. The upper section of curtain airbag is directed downwards when in the mounted state.

13 Claims, 3 Drawing Sheets

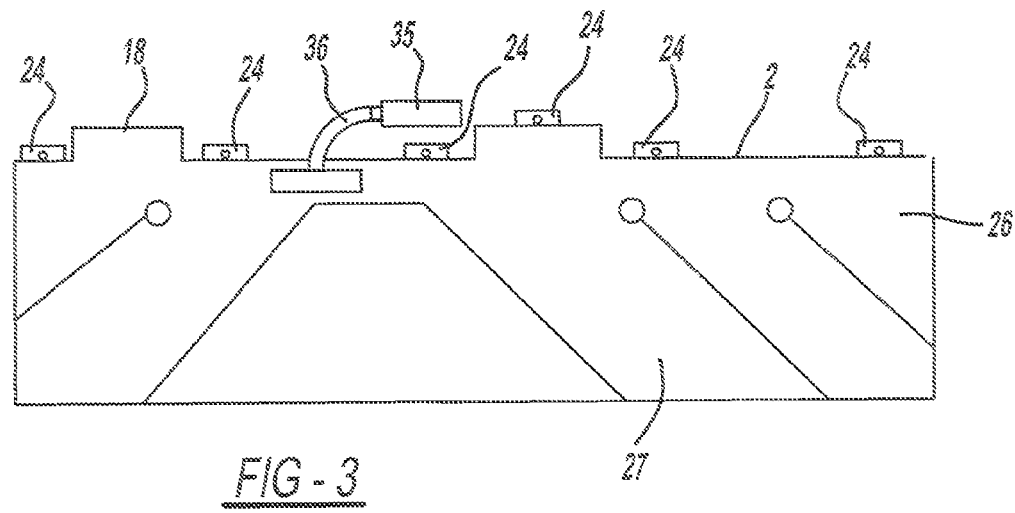
FIG-3
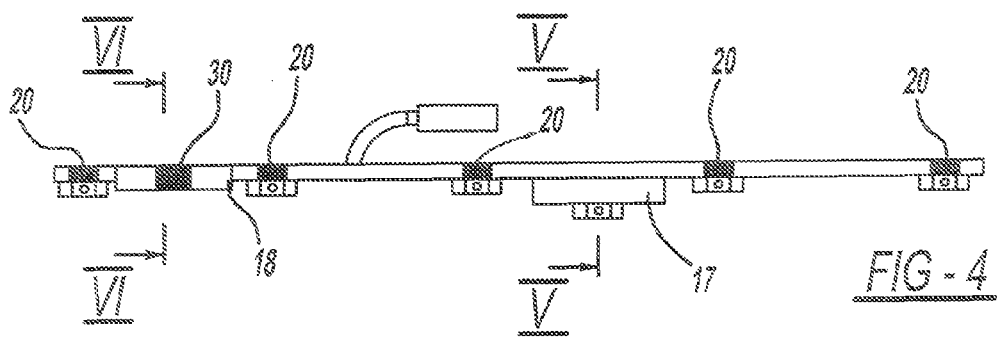
FIG-4
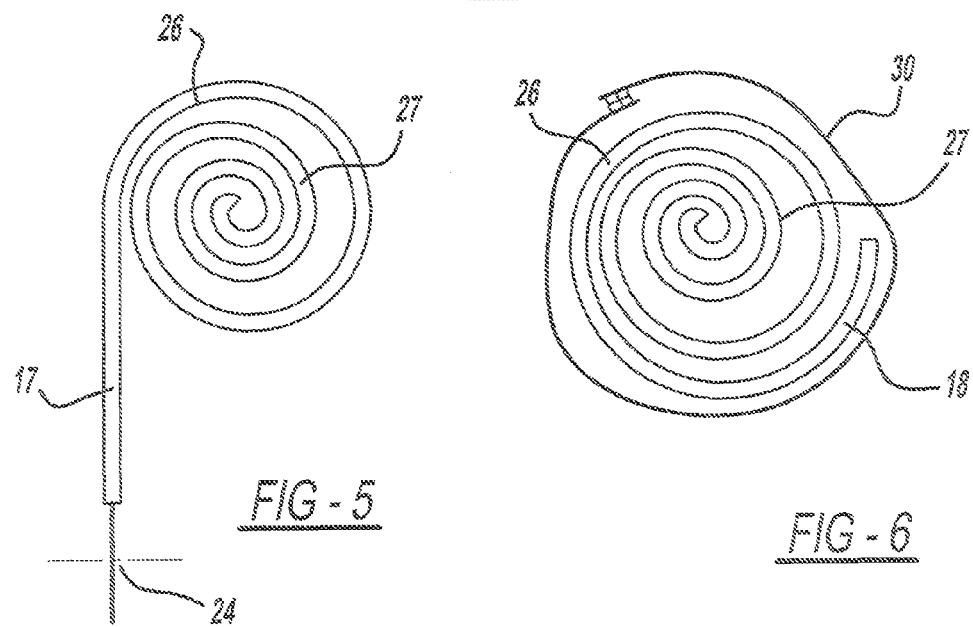
FIG-5
FIG-6

CURTAIN AIRBAG AND VEHICLE

CROSS REFERENCE TO RELATED APPLICATIONS

This application claims priority to PCT/EP2006/001635 filed Feb. 23, 2006 and DE 10 2005 011676.0 filed Mar. 11, 2005.

FIELD OF THE INVENTION

The invention relates to a curtain airbag with a guide chamber for a motor vehicle.

BACKGROUND OF THE INVENTION

With traditional side curtain airbags, the problem exists that the airbag is located in the vehicle above the top sections of the vehicle pillar interior trim or cladding. As the fixing point of a vehicle pillar cladding element is generally not positioned immediately on its top section, there is generally a hollow space behind it. During inflation of the curtain airbag, the airbag may catch on the top edge of a vehicle pillar cladding element and unfold in the hollow space behind the cladding. This may lead to the curtain airbag not being completely positioned in front of the side window of the vehicle and adjacent to the vehicle occupant.

The curtain airbag known from DE 103 31 133 A1 solves the aforementioned problem by providing a guide chamber in the form of an inflatable bubble in the upper section of the curtain airbag. When the curtain airbag is mounted in position, this bubble is inflated between the protection area of the airbag and the inner structure of the vehicle. The bubble is arranged on the airbag in such a way that it is positioned in the area of a vehicle pillar and moves into the specified hollow space during the inflation and unfolding process. The hollow space is thereby blocked from the protection area of the curtain airbag and is guided past the upper section of the vehicle pillar which constitutes the obstacle. The curtain airbag is fixed on a variety of mounting links which extend over the top edge of the airbag on the roof frame of the vehicle. As the top edge of the curtain airbag points upwards when mounted and the mounting links project upwards, the inflatable bubble which also points upwards must be folded such that during inflation the bubble repositions downward. If necessary, a seam may also be used to assist in repositioning the bubble during filling. This results in the disadvantage that the filling of the inflatable guide chamber is guided via the fold line, which means that early inflation of the bubble is difficult to accomplish.

Accordingly, there is a need for a side curtain airbag of the above described general type, which exhibits better filling of the guide chamber, as well as enabling simpler assembly of the protective chamber of the curtain airbag with the guide chamber.

SUMMARY OF THE INVENTION

In at least one embodiment, the present invention provides a side curtain airbag which can be mounted in the roof frame area of a motor vehicle. At least one guide chamber is arranged in the top section of the curtain airbag and is in fluid communication with an inflatable protection area. The guide chamber is inflated at the outer side of the curtain airbag when in its mounted state. The upper section of the curtain airbag faces downwards when the curtain airbag is mounted in the vehicle. This orientation of the upper section improves the filling, as the gas coming from a gas generator can stream unhindered into the guide chamber.

In another aspect of the present invention, the retaining means for fixing of the curtain airbag are faced downwards, so that they are arranged on both sides of the at least one guide chamber.

In yet another aspect of the present invention, one of the retaining means can be arranged on the guide chamber.

In the present invention, a guide chamber can be arranged in the area of a vehicle pillar. In at least one embodiment, there is one guide chamber in the area of the B pillar as well as another in the area of the C pillar of a motor vehicle.

The curtain airbag can be rolled up when in a mounted state and can be secured in this rolled state by means of a cover, whereby it may be rolled up along its outer side pointing in the direction of the inner structure of the vehicle.

At least one of the retaining means may be arranged under the rolled curtain airbag. In one aspect, all retaining means are located below the rolled curtain airbag. It is also possible that components of the fixing device are also fixed with the roof frame area at the height of the roll or even above it.

The at least one guide chamber can point downwards when the curtain airbag is in mounted state or alternatively it can be rolled together with the airbag.

In yet another aspect, the at least one guide chamber is formed in one piece with the protection area of the curtain airbag and extends over its upper section. Alternatively it can be provided that the at least one guide chamber is attached as a separate component on the protection area of the curtain airbag. This can be implemented by means of sewing, gluing or welding.

BRIEF DESCRIPTION OF THE DRAWINGS

Several embodiments result from the explanations and descriptions relating to the following figures.

FIG. 3 a plan view of a curtain airbag in an unfolded, flat state according to a second embodiment;

FIG. 4 the curtain airbag from FIG. 3 in rolled state as installed in a motor vehicle;

FIG. 5 a sectional view V-V through the curtain airbag of FIG. 4;

FIG. 6 a section view VI-VI through the curtain airbag of FIG. 4; and

DETAILED DESCRIPTION OF THE INVENTION

Figure 1:
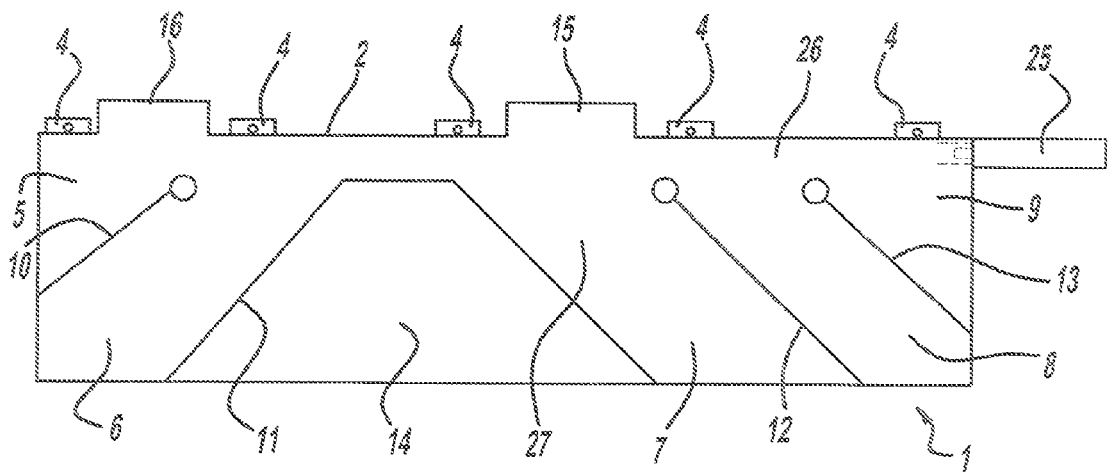
FIG. 1 a plan view of a curtain airbag in its unfolded, flat state according to a first embodiment.

In FIG. 1, a curtain airbag 1 according to at least one embodiment is shown in a non-inflated and unfolded state. At its upper section 2, the curtain airbag 1 exhibits a number of retaining means in the form of mounting tabs or links 4, which are used for fixing of the curtain airbag 1 in the side roof frame area of a motor vehicle. Furthermore, curtain airbag 1 exhibits an inflatable protection area 27 which is linked with a gas generator 25 by means of its filling channel 26. Gas generator 25 is connected with airbag 1, for example, in the front area of the upper section 2 and may also be connected with a sensor and evaluation unit, so that it is activated if a side or rollover accident is sensed and thereby inflates curtain airbag 1. Gas generator 25 in this case blows the gas directly into the filling channel 26, which guides the gas into the respective chambers. Alternatively, the gas generator 25 can be connected with a filling tube or filling pipe which is inserted into filling channel 26. This allows both the airbag fabric and the seams to be protected from the hot gas streaming out of the gas generator.

The inflatable protection area 27 is divided into a number of chambers 5, 6, 7 8, 9 which are divided from one another by darts or stitchings 10, 11, 12, 13. Chambers 5, 6, 7, 8, 9 are arranged in such a way that a front section of the protection area is formed for the front seats of a motor vehicle by means of chambers 7, 8, 9 and a rear section of the protection area is formed for the rear seats of a motor vehicle by chambers 5, 6. Between the front section and the rear section a non-inflatable section 14 is formed in an area which no vehicle occupant can typically reach during the accident. This can be in the area of the B pillar, for example.

Two guide chambers 15, 16 are provided in the upper section 2 of curtain airbag 1, which are connected in one piece with the protection area and which project over upper section 2. They are connected from the point of view of gas flow with filling channel 26 of curtain airbag 1, so that the gas which is created by gas generator 25 can enter quickly into guide chambers 15, 16. Guide chambers 15, 16 may be each located between two mounting links 4 whereby front guide chamber 15 is allocated to the B column area of the vehicle and rear guide chamber 16 is allocated to the C pillar area of the vehicle when in a mounted state.

Figure 2:
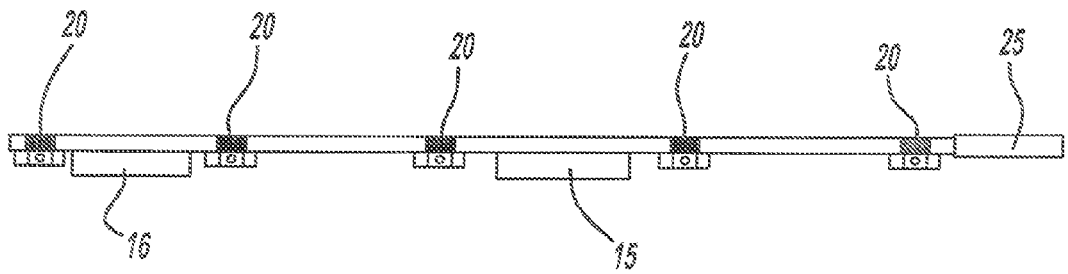
FIG. 2 the curtain airbag from FIG. 1 in rolled state as installed in a motor vehicle.

FIG. 2 illustrates an embodiment of the curtain airbag 1 in its folded or rolled state. The orientation of the airbag 1 corresponds to the mounted position in the roof frame area of the vehicle. Mounting links 4 project away from rolled curtain airbag 1 and point downwards. Thus, the fixing points by means of which curtain airbag 1 is fixed to the roof may be located underneath the folded roll.

A plurality of retaining straps 20 extending like a cover around the rolled curtain airbag 1 may be assigned to the mounting links 4, which hold the airbag in its rolled state. The retaining straps 20 may be configured to tear when the curtain airbag 1 is inflated. A perforation can be provided for this purpose, or the material thickness can be correspondingly thinner. As an alternative to straps 20, a single cover can be provided which corresponds to the length of curtain airbag 1. Guide chambers 15, 16 project downwards from curtain airbag 1 folded together as a roll. In the embodiment described here, the mounting links 4 point downwards. However, this is not absolutely necessary, the important aspect is only that the upper section 2 of the inflatable protection area 26 points downwards when in mounted state. Mounting links 4 could also point upwards.

A curtain airbag 1 according to another embodiment is shown in FIG. 3. It exhibits retaining means in the form of mounting links 24, which are located on the upper section 2. One of the mounting links 24 is located above the front guide chamber 17. The rear guide chamber 18 may be positioned between two retaining means 24. Alternatively, both guide chambers 17, 18 may be provided with retaining means 24.

A gas generator 35 may be inserted in the curtain airbag in its central area. Gas generator 35 may be connected with a T-shaped filling tube 36 which guides the gas into the front and rear direction of filling channel 26 and which protects the fabric section of the filling area.

FIG. 4 illustrates curtain airbag 1, similarly to FIG. 2, in its rolled state, which corresponds to the mounted location in the roof frame area. The front guide chamber 17 which is assigned to the B pillar area of the vehicle points downwards and may form one of the mounting links 24 for securing the guide chamber 17 to the vehicle. Rear guide chamber 18 may be rolled together with curtain airbag 1 and held in this position by a retaining strap 30.

FIG. 5 illustrates a section through guide chamber 17. Mounting link 24 is located beneath guide chamber 17 which is pointing downwards. The inflatable protection area 27 is folded together as a roll. It can be seen that curtain airbag 1 may be rolled along the side pointing towards the inner structure of the vehicle, its outer side. Accordingly, it unrolls during the inflation process along its outer side. The curtain airbag 1 shown in cross section may exhibit a letter "p"-shaped form.

FIG. 6 illustrates a cross-section through the guide chamber 18 of curtain airbag 1. Guide chamber 18 may be rolled together with inflatable protection area 27 and its filling channel 26. In order to secure the guide chamber 18 in rolled state, a retaining strap 30 may be provided, which surrounds the roll like a cover.

It is particularly advantageous if the filling channel 26 is located in an upper section of the rolled curtain airbag 1. The gas first penetrates through this; filling channel 26 guides the gas on both sides into guide chambers 17, 18 and the remaining inflatable protection area 27 and pushes this downwards. In this embodiment it is ensured that no sharp fold is formed between filling channel 26 and the respective guide chamber 17, 18. This is in particular made possible by the fact that mounting links 24 of curtain airbag 1 are pointing downwards.

Figure 7D:
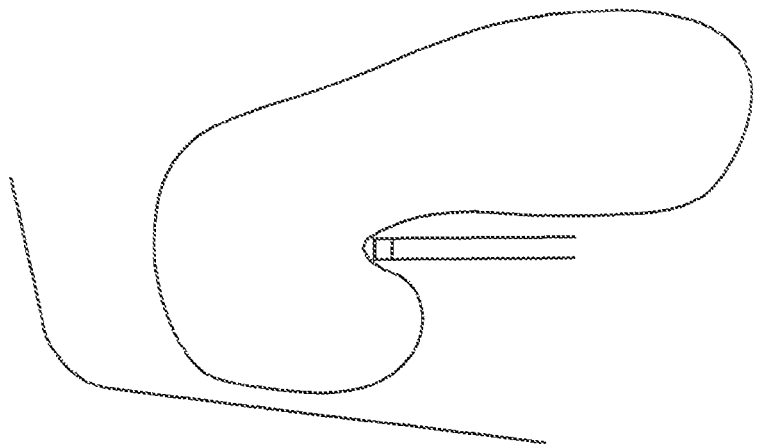
FIGS. 7a to 7d sequential illustrations of the inflation process of a curtain airbag.
Figure 7C:
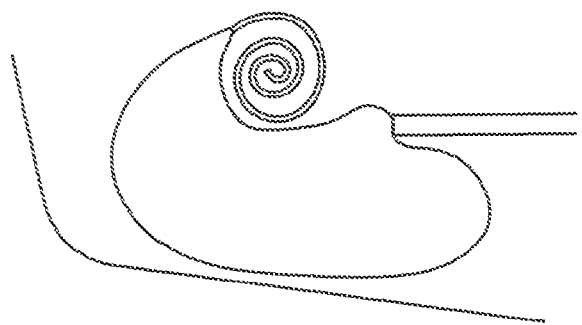
Figure 7B:
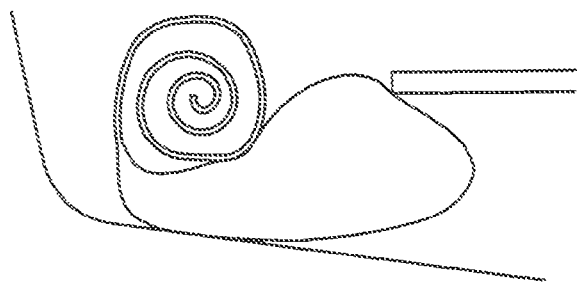
Figure 7A:
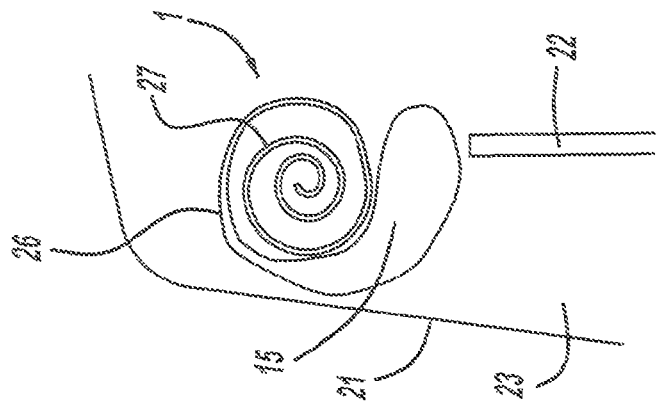

In FIGS. 7a to 7d, a sequence of a cross section through guide chamber 15 of at least one embodiment of the inflating curtain airbag 1 is shown. FIG. 7a shows the inflation situation immediately following activation of gas generator 25. Filling channel 26 connected with guide chamber 15 is located in the upper area of the roll and is inflated first. Because of the open connection to guide channel 15, guide channel 15 is inflated at an early point in time. Guide chamber 15 moves downwards from the roll and positions itself above, or in a hollow space formed between the top end of B pillar cladding 22 and vehicle side structure 21. As can be seen from further FIGS. 7b to 7d, guide chamber 15 blocks the hollow space 23 and leads the inflatable protection area 27 of curtain airbag 1 past the upper end of B pillar cladding 22, so that it can spread out towards the bottom along the side structure 21 and can position itself in front of the side windows.

As a person skilled in the art will readily appreciate, the above description is meant as an illustration of implementation of the principles of this invention. This description is not intended to limit the scope or application of this invention in that the invention is susceptible to modification, variation and change, without departing from the spirit of the invention, as defined in the following claims.

The invention claimed is:

1. A side curtain airbag installed in a mounted state in a side roof frame area of a motor vehicle, the motor vehicle having an internal vehicle structure disposed adjacent to the side roof frame area, the side curtain airbag comprising: at least one guide chamber in fluid communication with an inflatable protection area via a filling channel formed in the inflatable protection area, the at least one guide chamber configured such that upon inflation with inflation gas from a gas generator, the guide chamber blocks a hollow space formed at least in part by a portion of the internal vehicle structure to allow the inflatable protection area to deploy past the internal vehicle structure; the inflatable protection area having an upper section and one or more chambers which receive the inflation gas from the gas generator when the airbag is deployed; and wherein the side curtain airbag is in the mounted state with the inflatable protection area rolled up defining a roll and the upper section extends downwardly without forming a sharp fold that defines a fold line between the guide chamber and the filling channel.

2. The side curtain airbag according to claim 1 wherein the upper section includes a plurality of retaining means that mount the side curtain airbag to the motor vehicle.

3. The side curtain airbag according to claim 2 wherein the at least one guide chamber is located between two of the retaining means.

4. The side curtain airbag according to claim 2 wherein at least one of the retaining means is located on the guide chamber.

5. The side curtain airbag according to claim 1 wherein the guide chamber is positioned to correspond to a vehicle pillar of the motor vehicle.

6. The side curtain airbag according to claim 1 wherein the upper section includes a first guide chamber and a second guide chamber, wherein the first guide chamber and the second guide chamber are adjacent respectively to a B pillar and a C pillar of the motor vehicle.

7. The side curtain airbag according to claim 1 wherein the curtain airbag is rolled up in an undeployed state and is held in the undeployed state by at least one cover.

8. The side curtain airbag according to claim 1 wherein the curtain airbag is rolled up along its outer side.

9. The side curtain airbag according to claim 1 wherein the upper section includes at least one retaining means that mounts the side curtain airbag to the motor vehicle wherein the at least one retaining means is positioned underneath the undeployed rolled up side curtain airbag.

10. The side curtain airbag according to claim 1 wherein the at least one guide chamber points downward as the side curtain airbag is mounted in the motor vehicle in an undeployed state.

11. The side curtain airbag according to claim 1 wherein the at least one guide chamber is rolled up together with the side curtain airbag in an undeployed state.

12. The side curtain airbag according to claim 1 wherein the at least one guide chamber is connected in one piece with the protection area of the side curtain airbag.

13. The side curtain airbag according to claim 1 wherein the at least one guide chamber extends downwardly from and below the roll.

* * * * *